(12) United States Patent
Lippert et al.

(10) Patent No.: US 8,967,878 B2
(45) Date of Patent: Mar. 3, 2015

(54) IN-TRANSIT MIXING MACHINE DRIVE

(71) Applicant: Schaeffler Technologies AG & Co. KG, Herzogenaurach (DE)

(72) Inventors: Roland Lippert, Schwarzenbruck (DE); Jurgen Sapper, Furth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/966,541

(22) Filed: Aug. 14, 2013

(65) Prior Publication Data

US 2014/0050434 A1    Feb. 20, 2014

(30) Foreign Application Priority Data

Aug. 14, 2012   (DE) .......................... 10 2012 214 432

(51) Int. Cl.
| F16C 23/08 | (2006.01) |
| F16C 33/34 | (2006.01) |
| F16C 19/38 | (2006.01) |
| B28C 5/42 | (2006.01) |
| B60P 3/16 | (2006.01) |
| F16C 33/58 | (2006.01) |

(52) U.S. Cl.
CPC .............. *F16C 19/383* (2013.01); *F16C 23/086* (2013.01); *F16C 2322/00* (2013.01); *B28C 5/4217* (2013.01); *B60P 3/16* (2013.01); *F16C 19/38* (2013.01); *F16C 2240/34* (2013.01); *F16C 33/58* (2013.01)
USPC .......................................... 384/558; 384/568

(58) Field of Classification Search
CPC ...... F16C 19/383; F16C 19/386; F16C 23/08; F16C 23/082; F16C 23/084; F16C 23/088
USPC .................................................. 384/558, 568
See application file for complete search history.

(56) References Cited

U.S. PATENT DOCUMENTS 4,006,946 A *  2/1977  Mann et al. ................... 384/558
7,918,649 B2 * 4/2011  Nakagawa et al. ........... 416/174

FOREIGN PATENT DOCUMENTS

| DE | 331454 | 3/1920 |
| DE | 2111073 | 9/1972 |
| DE | 7736479 | 3/1978 |
| DE | 2753246 | 5/1979 |
| DE | 8326270 | 12/1983 |
| DE | 4314218 | 11/1994 |
| DE | 19606312 | 8/1997 |
| DE | 19829411 | 1/2000 |
| DE | 102004038502 | 2/2006 |
| DE | 102004047881 | 4/2006 |
| DE | 102010054318 | 6/2012 |
| EP | 1705392 | 1/2010 |
| JP | 2004245251 | 9/2004 |
| WO | 4034139 | 10/2003 |

* cited by examiner

*Primary Examiner* — Phillip A Johnson
(74) *Attorney, Agent, or Firm* — Volpe and Koenig, P.C.

(57) ABSTRACT

An in-transit mixing machine drive (2) having an output bearing (8) for supporting an output shaft for rotation relative to a drive housing, in which the output shaft is arranged inclined relative to a horizontal plane (5) at an angle ($\alpha$) and the output bearing (8) is formed by a pendulum roller bearing (9) whose rolling bodies (13, 14) roll in two bearing rows (10, 11) at pressure angles ($\beta$, $\gamma$) about a bearing axis (12). The pressure angles ($\beta$, $\gamma$) of the two bearing rows (10, 11) differ from each other or the rolling bodies (13, 14) of the two bearing rows (10, 11) differ from each other.

8 Claims, 1 Drawing Sheet

IN-TRANSIT MIXING MACHINE DRIVE

INCORPORATION BY REFERENCE

The following documents are incorporated herein by reference as if fully set forth: German Patent Application No. 102012214432.3, filed Aug. 14, 2012.

FIELD OF THE INVENTION

The invention relates to an in-transit mixing machine drive comprising an output bearing for supporting an output shaft so that it can rotate relative to a drive housing, wherein the output shaft is arranged inclined at an angle ($\alpha$) relative to a horizontal plane and wherein the output bearing is formed by a pendulum roller bearing whose rolling bodies roll about a bearing axis in two bearing rows at pressure angles ($\beta$, $\gamma$).

BACKGROUND

In-transit mixing machine drives are used in in-transit mixing machines (e.g., in-transit concrete mixers) in order to set the drum inclined at an angle ($\alpha$) relative to a horizontal plane in rotational movement with a desired output rotational speed. The essentially cylindrical drum is here connected to the drive at a closed, lower end, i.e., arranged closed to the horizontal plane, and supported in the drive by an output bearing of the drive. At a second end of the drum provided with an opening, the drum is supported so that it can rotate relative to the housing by a second bearing. While the second bearing absorbs only radial forces (e.g., track roller bearing), the output bearing of the drive must absorb both radial and also axial forces. Due to the inclined position of the drum and the contradictory conditions of use (in some cases, non-optimal lubrication, very low rotational speeds, large and sometimes impact-like loads, etc.), the output bearing must have sufficiently large dimensions.

Typically, a double-row pendulum roller bearing is used as the output bearing, because this can receive both large radial forces and also large axial forces. The pendulum roller bearing is installed inclined at an angle ($\alpha$) relative to a horizontal plane, in order to take into account the corresponding inclination of the drum rotational axis. In addition, a pendulum roller bearing makes it possible to compensate for the angle depending on the design, because dynamic changes in the angle of the drum rotational axis can be compensated.

The dimensioning of such output bearings is performed under the viewpoint that the desired service life is reached for a bearing design under the specified conditions (forces, lubrication, temperature, etc.). The influence of the service life is here realized by the dimensioning (in the sense of "scaling") of the pendulum roller bearing, which can be demanding in the given installation space.

From DE4034139A1, a drive arrangement for an in-transit concrete mixer is known whose planetary drive has a shaft that transitions into a driven flange and is supported by a pendulum roller bearing relative to a mixer drive housing.

Solutions with pendulum roller bearings for supporting the drum of an in-transit mixing machine are also known from the following publications: DE19829411A1, DE2111073A1, DE2753246A1, DE4314218B4, DE7736479U, and DE8326270U1.

From DE102004038502A1, a drive for driving a drum of an in-transit mixing machine is known, wherein a shaft is supported in the housing by a tapered roller bearing, and the tapered roller bearing has two single-row tapered roller bearings that are spaced apart in the axial direction with the same bore diameter and different outer diameters. A disadvantage in the solution of DE102004038502A1 is that the bearing due to the use of two separate, single-row tapered roller bearings is complicated and expensive and the installation space must be adapted to the different outer diameters.

From EP1705392B1, a double-row pendulum roller bearing for supporting a main shaft of the drive of a wind turbine is known whose two bearing rows have rolling bodies with different lengths and different pressure angles.

SUMMARY

The present invention is based on the objective of providing an in-transit mixing machine drive according to the class, wherein this drive has a long service life with small dimensions and can be produced and assembled easily and economically.

This object is met by an in-transit mixing machine drive according to the independent claim. Consequently, an in-transit mixing machine drive according to the class is characterized in that the pressure angles ($\beta$, $\gamma$) of the two bearing rows differ from each other and/or the rolling bodies of the two bearing rows differ from each other.

The invention involves the knowledge that even the relatively low inclination of the drum rotational axis relative to a horizontal plane can lead to a considerable axial force loading of the output bearing. Especially for a loaded drum and for braking procedures of the in-transit mixing machine, one of the two bearing rows is subjected to extremely high loads.

Instead of selecting the typical path of a corresponding dimensioning of the output bearing or else, e.g., using two individual tapered roller bearings spaced apart from each other in the axial direction, the invention uses a specific design construction of the pendulum roller bearing: through the asymmetric setup of the pendulum roller bearing, the asymmetrically acting loads can be received optimally. Furthermore, because a pendulum roller bearing is used, it is possible to easily absorb additional tilting of the drum rotational axis (e.g., due to load imbalance) occurring during operation. According to the invention it is also enabled to form the output bearing in a single bearing point, so that a very compact construction is realized that can be integrated into a specified environment construction without a problem.

The drive can be formed, e.g., by a planetary drive.

Preferred embodiments are described below and in the claims.

According to one embodiment it is provided that the pressure angles of the two bearing rows intersect on the bearing axis. Optimal kinematics of the pendulum roller bearing are achieved; the rolling bodies of both bearing rows roll about the bearing axis at the kinematic rotational speed.

A very good, i.e., uniform, loading of the two bearing rows is achieved if the pressure angle of a first bearing row is greater than 10 degrees and the pressure angle of a second bearing row is less than 10 degrees. The uniform loading leads to an optimal use of the pendulum roller bearing and consequently to a maximum use of the present installation space.

It is possible that the pressure angle of one of the two bearing rows is 0 degrees. This bearing row is thus mainly provided for transmitting radial forces, but can also transmit small axial force components in both axial directions due to the shape of the rolling bodies (spherical rollers). The other of the two bearing rows consequently has a pressure angle that is different from 0 degrees (i.e., greater) and can absorb the main axial forces.

It has been shown that the pressure angles can be selected with respect to the angle (α) at which the output shaft is inclined relative to a horizontal plane: thus it can be provided that, for a difference (δ) of the pressure angles of the two bearing rows, the following relationship is applicable: $0.9 \cdot \alpha < \delta < 1.1 \cdot \alpha$. The difference (δ) is defined by $|\beta - \gamma|$. The pressure angles β, γ are each specified as a positive number of the angle by which a pressure line is inclined relative to a plane perpendicular to the bearing axis in an axial section.

It is also possible that the number of rolling bodies of the two bearing rows is different. This measure can also contribute—in a supporting role—to the reduction of non-uniform loading of the two bearing rows, especially of the raceways of the bearing rings.

To enable simple assembly it can be provided that the pendulum roller bearing has a one-part outer ring and/or a one-part inner ring.

A simple integration in an existing connection construction can be achieved in that an axial extent of the outer ring is greater than an axial extent of the inner ring. Advantageously it is provided here that the outer ring projects past the inner ring in the axial direction to both sides. In this case, a tilting of the outer ring relative to the inner ring within the pendulum roller bearing is absorbed, i.e., the connection construction does not have to provide corresponding clearances for this purpose.

BRIEF DESCRIPTION OF THE DRAWINGS

Embodiments of the present invention are explained below with reference to the accompanying figures. Shown herein are.

DETAILED DESCRIPTION OF THE PREFERRED EMBODIMENTS

Elements that are identical or have the same function are marked by identical reference symbols in the figures.

Figure 1:
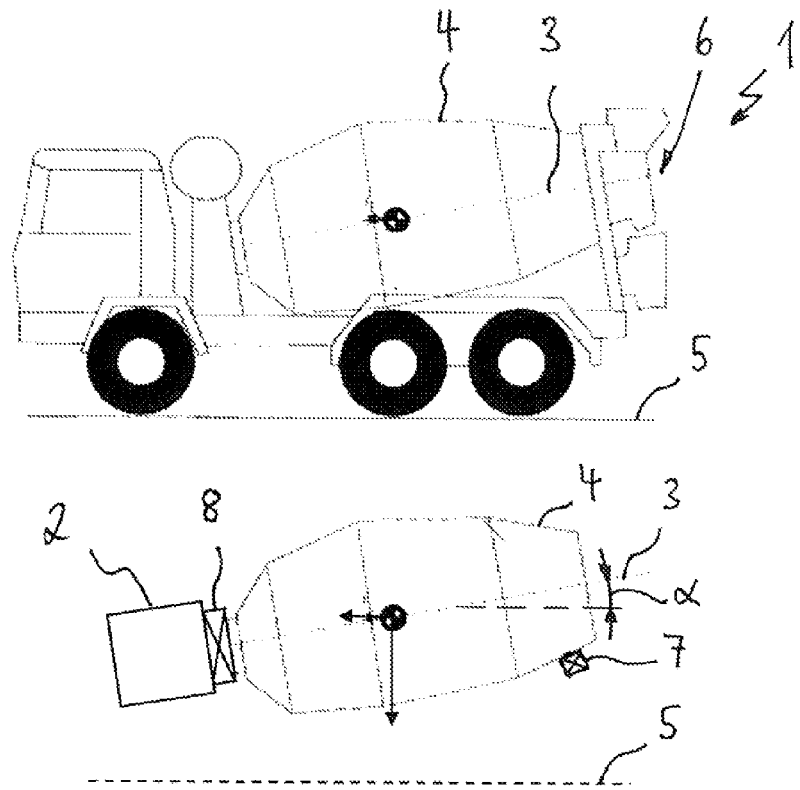
FIG. 1 is a view of an in-transit mixing machine comprising an in-transit mixing machine drive according to the invention.

FIG. 1 shows an in-transit mixing machine 1 comprising an in-transit mixing machine drive 2 that is constructed according to the invention and is connected to and drives a drum 4 that can rotate about a drum rotational axis 3. The drum 4 is arranged inclined at an angle α relative to a horizontal plane 5. The drum 4 is supported in the radial direction by a radial bearing 7 on an open end 6; the radial bearing 7 receives radial forces that act only perpendicular to the horizontal plane 5. The drum 4 is connected to a not-shown output shaft on the in-transit mixing machine drive 2 and is supported so that it can rotate about the drum rotational axis 3 by means of an output bearing 8. The output bearing 8 can receive both radial forces and also axial forces and is formed by a double-row pendulum roller bearing.

According to the invention, the two bearing rows of the pendulum roller bearing have different pressure angles.

Figure 2:
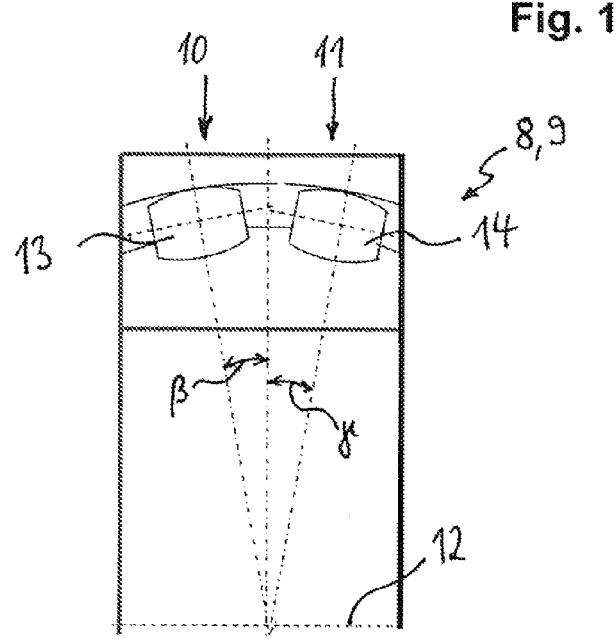
FIG. 2 is a view of a pendulum roller bearing according to a first embodiment of the invention.

A pendulum roller bearing 9 according to a first embodiment of the invention is shown in FIG. 2 for use in the in-transit mixing machine drive 2 according to FIG. 1. The upper half of an axial section enclosing the bearing axis 12 is shown. The two pressure angles intersect at a point on the bearing axis 12.

The pendulum roller bearing 9 has two bearing rows 10, 11 that are spaced apart in the axial direction with respect to the bearing axis 12 and whose pressure angles β, γ differ from each other—not shown in the drawing. The difference of the pressure angles β, γ leads to a different magnitude absorption of axial forces in the two bearing rows 10, 11. The two bearing rows 10, 11 have identical rolling bodies 13, 14, namely spherical roller bearings. These can be spaced apart from each other in terms of their circumferences and guided by a cage.

For a small difference in the pressure angles, the outer dimensions of the pendulum roller bearing 9 can correspond to those of a standard pendulum roller bearing, so that a new design of the surrounding construction is not required.

Figure 3:
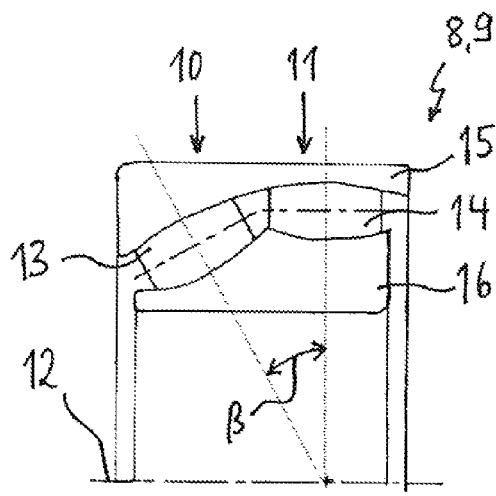
FIG. 3 is a view of a pendulum roller bearing according to a second embodiment of the invention.

FIG. 3 shows a pendulum roller bearing according to a second embodiment of the invention. In contrast to the first embodiment, the difference of the pressure angles β, γ is more strongly pronounced and immediately identifiable with the naked eye. The pressure angle β of the first bearing row 10 is approximately twice as large as a typical pressure angle of a pendulum roller bearing. In contrast, the pressure angle γ of the second bearing row 11 is 0 degrees.

The outer ring 15 has a larger axial extent than the inner ring 16 and projects past this inner ring in the axial direction on both sides. Even for a maximum displacement of the inner ring 16 relative to the outer ring 15, the inner ring 16 thus remains within the outer ring in the axial direction.

LIST OF REFERENCE NUMBERS

1 In-transit mixing machine
2 In-transit mixing machine drive
3 Drum rotational axis
4 Drum
5 Horizontal plane
6 End
7 Radial bearing
8 Output bearing
9 Pendulum roller bearing
10 Bearing row
11 Bearing row
12 Bearing axis
13 Rolling body
14 Rolling body
15 Outer ring
16 Inner ring
α Inclination angle
β Pressure angle
γ Pressure angle
δ Difference of the pressure angles

The invention claimed is:

1. An in-transit mixing machine drive, comprising an output bearing for supporting an output shaft for rotation relative to a drive housing, the output shaft is arranged inclined relative to a horizontal plane at an angle (α) and the output bearing is formed by a pendulum roller bearing having rolling bodies that roll in two bearing rows about a bearing axis, and pressure angles (β, γ) of the two bearing rows differ from each other or the rolling bodies of the two bearing rows differ from each other, wherein, for a difference (δ) of the pressure angles (β, γ) of the two bearing rows, the following relationship is applicable: $0.9 \cdot \alpha < \delta < 1.1 \cdot \alpha$.

2. The in-transit mixing machine drive according to claim 1, wherein the pressure angles (β, γ) of the two bearing rows intersect on the bearing axis.

3. The in-transit mixing machine drive according to claim 1, wherein a pressure angle (β, γ) of a first bearing row is greater than 10 degrees and a pressure angle ($\beta$, $\gamma$) of a second bearing row is less than 10 degrees.

4. The in-transit mixing machine drive according to claim 1, wherein a pressure angle ($\gamma$) of one of the two bearing rows equals 0 degrees.

5. The in-transit mixing machine drive according to claim 1, wherein the pendulum roller bearing has at least one of a one-part outer ring or a one-part inner ring.

6. The in-transit mixing machine drive according to claim 5, wherein an axial extent of the outer ring is greater than an axial extent of the inner ring.

7. The in-transit mixing machine drive according to claim 6, wherein the outer ring projects past the inner ring in the axial direction on both sides.

8. An in-transit mixing machine drive, comprising an output bearing for supporting an output shaft for rotation relative to a drive housing, the output shaft is arranged inclined relative to a horizontal plane at an angle ($\alpha$) and the output bearing is formed by a pendulum roller bearing having rolling bodies that roll in two bearing rows about a bearing axis, and pressure angles ($\beta$, $\gamma$) of the two bearing rows differ from each other or the rolling bodies of the two bearing rows differ from each other, wherein a number of the rolling bodies in the two bearing rows is different.

* * * * *